United States Patent [19]

Reinhall

[11] Patent Number: 5,335,463
[45] Date of Patent: Aug. 9, 1994

[54] COMPOSITION FOR VIBRATION DAMPING

[76] Inventor: Per Reinhall, 10758 Riviera Pl. NE., Seattle, Wash. 98125

[21] Appl. No.: 760,163

[22] Filed: Sep. 16, 1991

[51] Int. Cl.$^5$ .............................................. E04B 1/98
[52] U.S. Cl. ................................................ 52/167 R
[58] Field of Search ............... 52/173 R, 167 R, 573; 428/463

[56] References Cited

U.S. PATENT DOCUMENTS

| | | | |
|---|---|---|---|
| 4,425,980 | 1/1984 | Miles. | |
| 4,593,502 | 6/1986 | Buckle | 52/573 X |
| 4,633,628 | 1/1987 | Mostaghel | 52/573 X |
| 4,709,781 | 12/1987 | Scherzer | 428/463 |
| 4,713,917 | 12/1987 | Buckle | 52/573 X |
| 4,731,966 | 3/1988 | Fujita | 52/573 X |
| 5,182,888 | 2/1993 | Miyamoto | 52/573 X |

FOREIGN PATENT DOCUMENTS

| | | | |
|---|---|---|---|
| 2921828 | 2/1983 | Fed. Rep. of Germany | 52/167 R |
| 1029541 | 1/1989 | Japan | 52/167 R |
| 4001843 | 1/1989 | Japan | 52/167 R |

OTHER PUBLICATIONS

An Analytical Model for Vibration of Laminated Beams Including the Effects of Both Shear and Thickness Deformation in the Adhesive Layer; Transactions of the American Society of Mechanical Engineers–1985.

Primary Examiner—Carl D. Friedman
Assistant Examiner—Beth A. Aubrey
Attorney, Agent, or Firm—Graybeal Jackson Haley & Johnson

[57] ABSTRACT

A composition for vibration damping of a structure releasing vibrational energy through its surface is disclosed. The composition includes either a substantially non-homogeneous visco elastic damping layer on the surface of the structure, or a visco elastic damping layer that is either homogeneous or non-homogeneous discontinuously attached to the surface of the structure. The non-homogeneity of the damping layer is caused by substantially planar voids, substantially spherical voids, or particles. The discontinuous attachment of the damping layer and the surface of the structure is caused by a plurality of grooves, indentations, or by the presence of a non-adhesive material where the damping layer and the surface structure are not secured.

19 Claims, 5 Drawing Sheets

COMPOSITION FOR VIBRATION DAMPING

BACKGROUND OF THE INVENTION

This invention pertains to vibration damping of structures that release vibrational energy through their surfaces, and more specifically to compositions for vibration damping of such structures that include a visco elastic damping layer to convert vibrational energy to stress energy and/or strain energy and dissipate this energy as heat. Thus, the visco elastic damping layer dissipates vibrational energy in the form of heat as it is subjected to vibratory motions. The dissipation of heat from the visco elastic damping layer, i.e., the efficiency of the visco elastic damping layer, is directly proportional to the strain levels generated in this damping layer during the vibratory motion. It is thus desirable to maximize the generation of total strain energy in the damping layer. In operation, as the primary structure deforms due to vibratory motion, the damping layer likewise deforms. In this manner, strain energy is incurred which is subsequently dissipated as heat. This dissipation of heat removes energy from the vibratory motion of the primary structure, resulting in less remaining vibratory energy and a faster decay of the vibratory motion compared to an undamped primary structure.

The primary structure referred to above includes any structure having a surface through which vibrational energy is released. More specifically, the term primary structure includes exterior walls, interior walls, foundations, floors, ceilings of buildings, etc., and other structures where noise reduction is desired, as well as structures of transportation devices such as aircraft, automobiles, and ships, where for example noise reduction and/or increased material fatigue levels are desired.

In the past, a common way of vibration damping has been "constraint layer" damping in which damping tape comprised of a layer of visco elastic material is attached to the surface of the structure whose vibration is to be damped and a thin constraining layer formed of, for example, aluminum foil, is attached to the other side of the damping layer. The constraining layer may have a high elastic modulus such that it is stiff in longitudinal extension but bends readily. As the primary structure undergoes bending or longitudinal deflection during the vibratory motions, the damping layer is sheared between the primary structure and the constraining layer. Thus, vibrational energy is converted into shear energy which, in turn, is dissipated as heat by the damping layer. In this manner, vibrational energy is further reduced when compared to the use of a damping layer without a constraint layer. The use of damping tape, however, adds a large amount of weight to the damped primary structure, and is very labor intensive to apply to the primary structure.

U. S. Pat. No. 4,425,980, issued to Miles discloses another type of vibration damping composition in which beam dampers comprising a stiff, lightweight, elongate beam and a layer of visco elastic material located along an attachment flange of the beam are employed. The flange of the beam is attached by the layer of visco elastic material to the skin of the structure whose vibrations are to be damped. The beam acts as a constraining element for the visco elastic attachment layer. The beam is oriented such that it is stiff in a plane transverse to the plane of the structure skin, resulting in thickness deformation of the layer of the visco elastic material (rather than shear deformation) and conversion of the vibration energy into heat. The above vibration damping composition suffers from two problems. First, the beam required by the above invention significantly adds to the required thickness of the damped structure. Additionally, the overall weight of the damped structure is markedly increased.

Additional vibration damping techniques are discussed in the above Miles patent, which is incorporated herein by reference.

A need thus exists for a lightweight vibration damping composition lacking stiffening beams or members that add excessive weight, cost, and complexity to the composition. A need also exists for a vibration damping composition of the above type in which an increased amount of vibratory energy from the primary structure is converted into strain energy by the vibration damping composition, and is dissipated as heat by the presence of either non-homogeneities in the damping layer or discontinuities between the primary structure and the damping layer.

SUMMARY OF THE INVENTION

In accordance with the invention, a composition for vibration damping of a structure releasing vibrational energy through its surface is provided. The composition converts vibrational energy released through the surface of the primary structure into strain energy, which is dissipated as heat.

In a first embodiment of the present invention, the composition includes a substantially non-homogeneous visco elastic damping layer on the surface of the structure whose vibrations are to be damped. The non-homogeneity of the damping layer increases the natural damping ability of the damping layer by increasing conversion of vibrational energy into strain energy and heat.

The damping layer of the first embodiment preferably has adhesive properties for attachment to the surface of the structure whose vibrations are to be damped. However, if the damping layer does not have adhesive properties, an adhesive layer is employed to secure the damping layer to the surface of the structure.

In the first embodiment of the present invention, one damping layer is preferably employed. However, numerous damping layers can be used, with each damping layer adhesively secured to another and with one or more of these additional damping layers being non-homogeneous. These numerous damping layers may have either the same or differing degrees of non-homogeneity.

The non-homogeneity of the damping layer in the first embodiment of the present invention is caused by one or more of substantially planar voids, substantially spherical voids (which may contain a liquid or gas), or particles. When particles are employed, they are preferably shaped in one or more needle-like, flake-like, granular, fibrous, cylindrical, ovoid, spherical, conical, pyramidal, obelisk, wedge, ring, or cubic configurations.

The first embodiment of the present invention preferably includes a stiff constraint layer secured to the damping layer. This stiff constraint layer increases the vibrational energy converted to strain energy and dissipated as heat by the damping layer.

In a second embodiment of the present invention, a vibration damping composition includes a visco elastic damping layer, that is either homogeneous or non-homogeneous, and is discontinuously attached to the surface of the structure whose vibrations are to be damped.

The damping layer of the second embodiment preferably has adhesive properties for attachment to the surface structure whose vibrations are to be damped. However, if adhesive properties are lacking in the damping layer, an adhesive layer is employed to discontinuously secure the damping layer to the surface of the structure.

In the second embodiment of the present invention, one damping layer is preferably employed. However, numerous damping layers can be used, with each damping layer adhesively secured to another such that one or more of these additional damping layers are discontinuously secured. Also, one or more of these additional damping layers can be comprised of non-homogeneous material having either the same or differing degrees of non-homogeneity.

In the second embodiment of the present invention, the discontinuous attachment of the damping layer to the surface of the structure whose vibrations are to be damped may be caused by a plurality of linear or non-linear grooves or arbitrarily shaped indentations in the primary structure, the damping layer and/or the adhesive layer, if present. These linear or non-linear grooves or arbitrarily shaped indentations may either be oriented parallel or aparallel with respect to each other, and may intersect or may not intersect to form any desired pattern. Additionally, these linear or non-linear grooves or arbitrarily shaped indentations may be inlaid with materials non-adhesive with respect to the primary structure or the damping layer. Furthermore, this non-adhesive material may take the place of the above mentioned linear or non-linear grooves or arbitrarily shaped indentations by printing of the non-adhesive material in any patter on the primary structure, damping layer, and/or the adhesive layer, if present.

The second embodiment of the present invention preferably includes a stiff constraint layer discontinuously secured to the damping layer to increase the vibrational energy converted to strain energy and dissipated as heat by the damping layer. Alternatively, this stiff constraint layer can be continuously secured to the damping layer.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
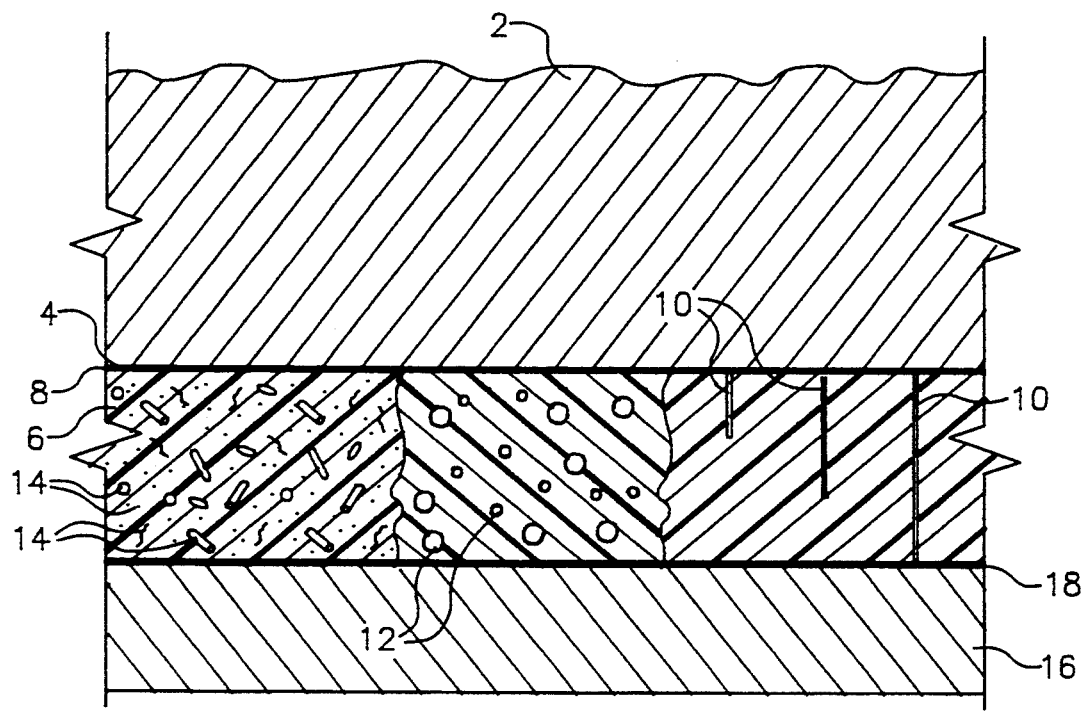
FIG. 1 is a partial side view of the first embodiment of the composition for vibration damping of the present invention showing planar voids, spherical voids and variously shaped particles causing non-homogeneity of the damping layer.

Referring first to FIG. 1, the first embodiment of the vibration damping composition of the present invention is shown. Primary structure 2 includes surface 4. Damping layer 6 is attached to surface 4 either by its intrinsic adhesive properties, or by adhesive layer 8. Adhesive layer 8 is comprised of an adhesive known in the art that is compatible with the specific composition of damping layer 6 that is employed. Damping layer 6 is preferably visco elastic; however, non-visco elastic damping layers may be employed as long as they are able to convert vibrational energy into strain energy, and dissipate this energy as heat. An example of a visco elastic damping material that may be employed in damping layer 6 is ISD 830 visco elastic material sold by Minnesota Manufacturing and Mining Company of St. Paul, Minn. In this first embodiment of this present invention, damping layer 6 must be substantially non-homogeneous. "Non-homogeneous" as defined herein means non-uniformity of structure sufficient to impart greater vibration damping qualities. As shown in FIG. 1, the following examples of non-homogeneity of damping layer 6 are encompassed by the present invention. It is to be noted, however, that these examples of non-homogeneity are not intended to be exhaustive but merely to be exemplary. First, damping layer 6 may include a plurality of substantially planar voids 10 of either varying or identical lengths and widths. Also, damping layer 6 may include a plurality of substantially spherical voids, or bubbles, 12 which may include one or more of a number of gases or fluids. Damping layer 6 may also include small particles 14 which may be, for example, needle-like, flake-like, granular, fibrous, cylindrical, ovoid, spherical, pyramidal, obelisk, wedge, ring or cubic in shape. These particles 14 may either be adhesive with respect to damping layer 6 (and comprised of, for example, glass, carbon, or steel) or may be non-adhesive with respect to damping layer 6 (and comprised of, for example, tetrafluroethene, known as "Teflon"). In order to obtain the desired degree of non-homogeneity of damping layer 6, any combination of the above planar voids 10, spherical voids 12 or particles 14 may be employed. The non-homogeneity of damping layer 6 allows greater vibration damping by increasing the strain energy within damping layer 6 that, in turn, results in greater heat dissipation. This increase in strain energy is due to the presence of planar voids 10, substantially spherical voids 12 and/or particles 14 which produce isolated concentration of increased strain energy within damping layer 6. The net result is an increase in the amount of vibrational energy damped by damping layer 6.

Still referring to FIG. 1, stiff constraint layer 16 may be employed to further increase the vibration damping of the present invention by inducing shear energy within damping layer 6, as described above. Stiff constraint layer 16 may be comprised of, for example, aluminum foil or plates. If damping layer 6 has adhesive properties, stiff constraint layer 16 may be secured directly thereto. If, however, damping layer 6 is not adhesive in nature, adhesive layer 18 may be employed.

Additionally, a second primary structure can be included on the side of damping layer 6 that is not secured to primary structure 2 such that damping layer 6 (and optional adhesive layer 8) is sandwiched therebetween.

Figure 2:
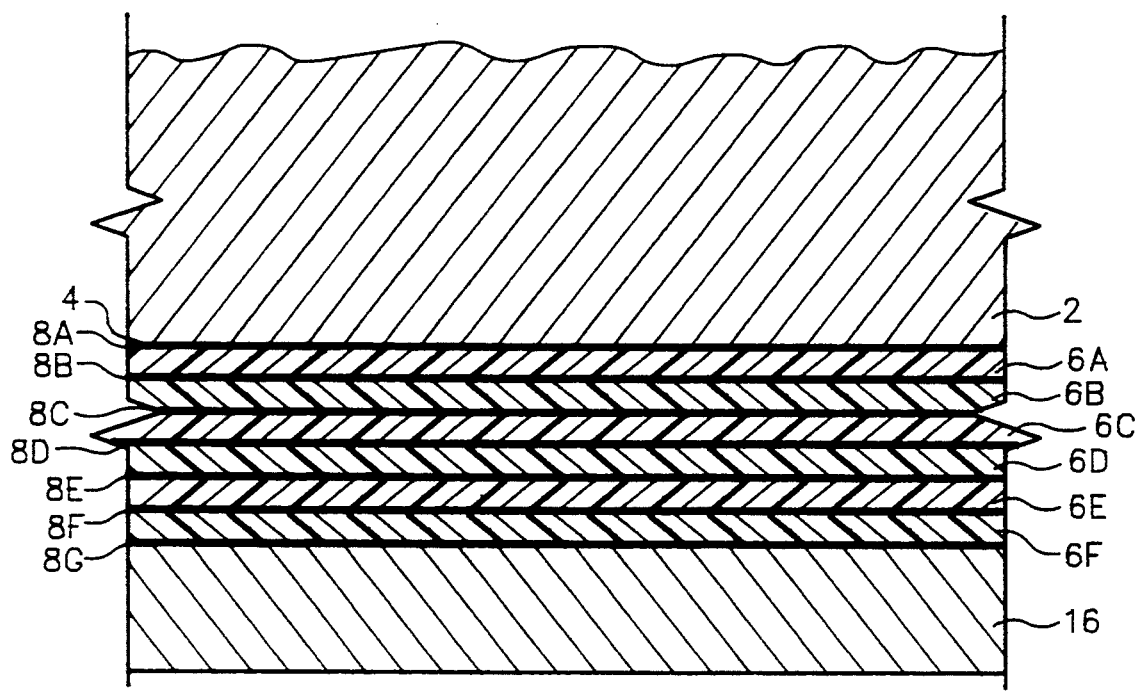
FIG. 2 is a partial side view of the first embodiment of the present invention having one or more non-homogeneous damping layers.
Figure 3:
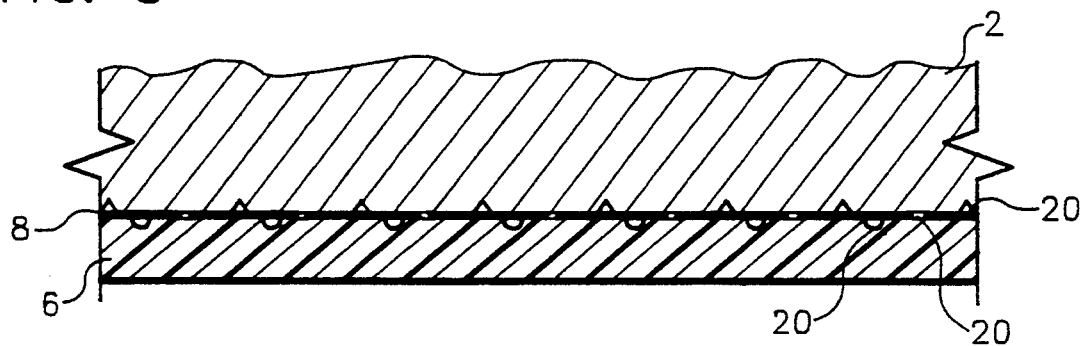
FIG. 3 is a partial side view of the second embodiment of the present invention showing discontinuous attachment of the damping layer to the surface of the structure whose vibration is to be damped.

Referring next to FIG. 2, in this aspect of the first embodiment, numerous damping layers 6A through F are present. If some or all of these damping layers 6A through F are not adhesive in nature, adhesive layers 8A through G may be employed. When multiple damping layers 6A through F are employed, the desired degree of non-homogeneity for each individual test damping layer 6A through F may be selected to optimize the vibration damping characteristics of the present invention. The multiple damping layers 6A through F may have the same degree or varying degrees of non-homogeneity. Additionally, some homogeneous damping layers may be included in layers 6A through F. Note that FIG. 2 shows six damping layers 6A through F for exemplary purposes only. More or less damping layers 6 may be employed as needed.

Referring now to FIGS. 3 through 7, a second embodiment of the present invention is described in which damping layer 6 is not required to be non-homogeneous. It is to be understood that except as otherwise stated below, the components of the second embodiment sharing the same numerals with the components of the first embodiment are the same. Referring first to FIG. 2, primary structure 2 includes surface 4 onto which is attached damping layer 6. If damping layer 6 is not adhesive in nature, adhesive layer 8 is employed to secure damping layer 6 to primary structure 2. Again, a second primary structure can be included on the side of damping layer 6 that is not attached to primary structure 2 such that damping layer 6 (and optional adhesive layer 8) is sandwiched therebetween.

It is an essential aspect of this second embodiment of the present invention that the attachment of damping layer 6 to primary structure 2 is subsequently discontinuous. "Discontinuous" is defined herein as lacking sufficient continuity of attachment of primary structure 2 and damping layer 6 such that the vibration damping characteristics are increased. As shown in FIGS. 3 through 5N, the discontinuous attachment of damping layer 6 to primary structure 2 is effectuated by a plurality of discontinuities 20 which are preferably linear or non-linear grooves or arbitrarily shaped indentations in the primary structure 2, the damping layer 6 and/or the adhesive layer 8, if present, such that non-attached areas exist between the attachment of primary structure 2 and damping layer 6. These linear or non-linear grooves or arbitrarily shaped indentations may either be oriented parallel or aparallel with respect to each other, and may intersect or may not intersect to form any desired pattern. Additionally, these linear or non-linear grooves or arbitrarily shaped indentations may be inlaid with materials non-adhesive with respect to the primary structure or the damping layer (such as, for example, tetrafluroethene, known as "Teflon"). Furthermore, this non-adhesive material may take the place of the above mentioned linear or non-linear grooves or arbitrarily shaped indentations by printing of the non-adhesive material in any pattern on the primary structure 2, damping layer 6, and/or the adhesive layer 8, if present. Discontinuities 20 may have any configuration linear or non-linear. Examples of shapes shown in the FIGS. 5A through 5N are selected for explanatory reasons only. FIGS. 5A through 5N show examples of grooves, indentations and/or printed non-adhesive material forming discontinuities in shapes that can be combined, varied and be subjected to unlimited changes. Additionally, as shown in FIGS. 5A through 5N, discontinuities 20 of any pattern or shape may be formed in discrete groups 22, that can be placed in any pattern and sequence a desired distance from each other, to maximize the strain damping efficiency. Additionally, discontinuities 20 may have a u-shaped, v-shaped, square-shaped, or rectangular-shaped in cross-section, for example. It is to be noted that the above discussed and illustrated shapes, locations and patterns of discontinuities 20 are intended to be merely exemplary and explanatory, and not exhaustive.

Figure 4:
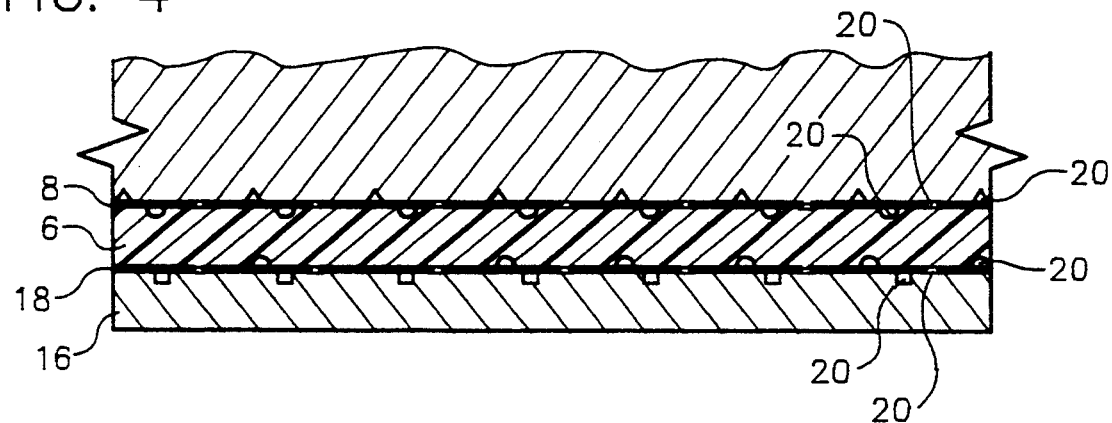
FIG. 4 is a partial side view of the second embodiment of the present invention showing the optional stiff constraint layer.
Figure 5A:
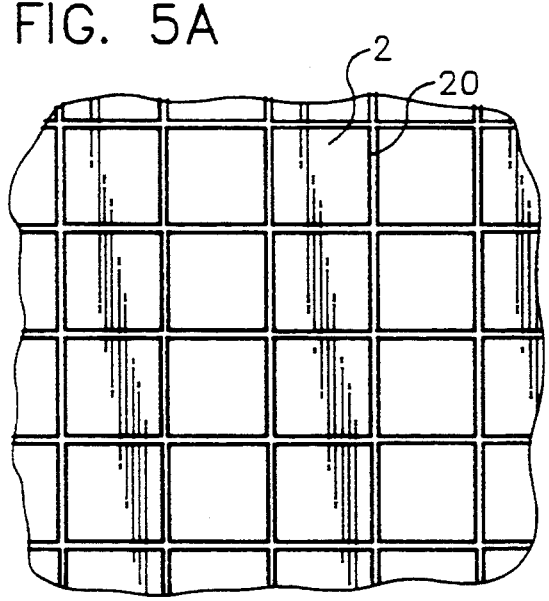
FIGS. 5A–5N are section views of the second embodiment of the present invention taken at line 5—5 of FIG. 7 and showing exemplary patterns of the discontinuous attachment of the damping layer and the surface of the structure.
Figure 5B:
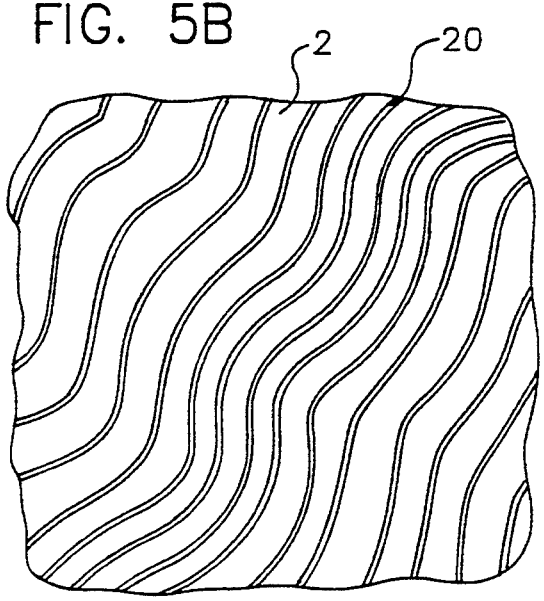
Figure 5C:
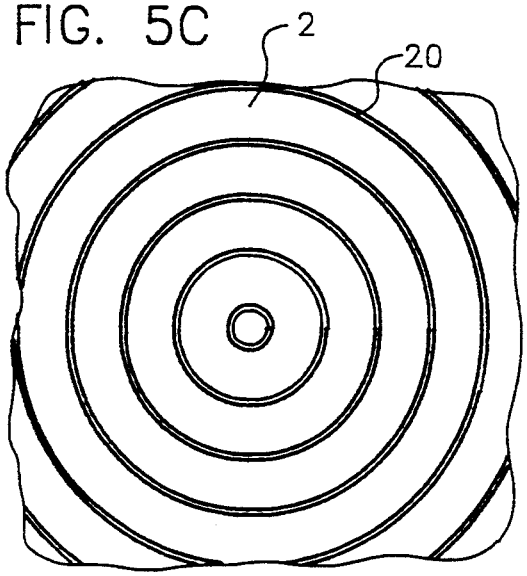
Figure 5D:
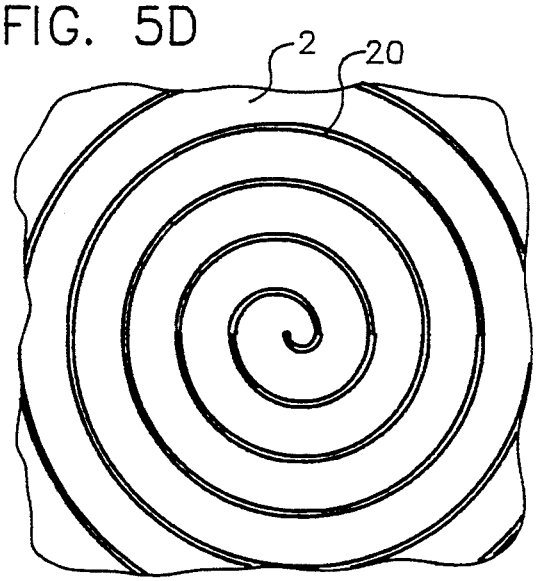
Figure 5E:
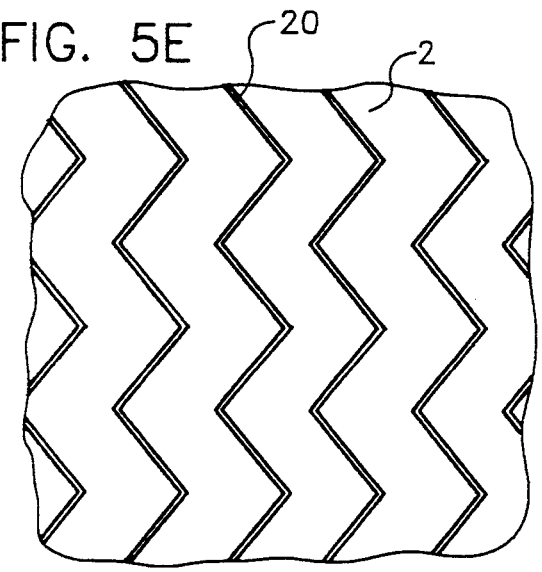
Figure 5F:
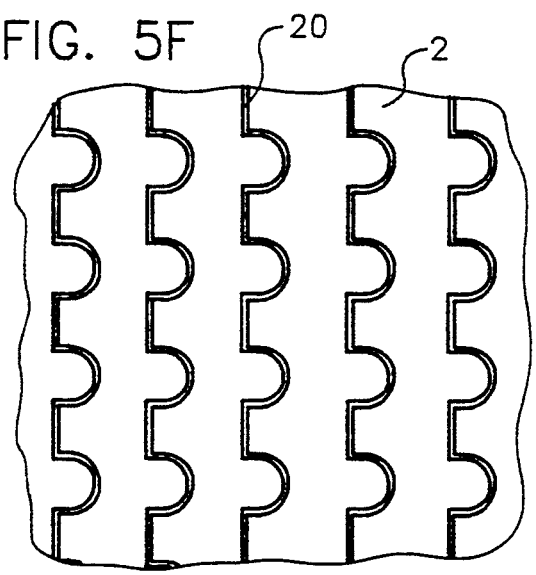
Figure 5G:
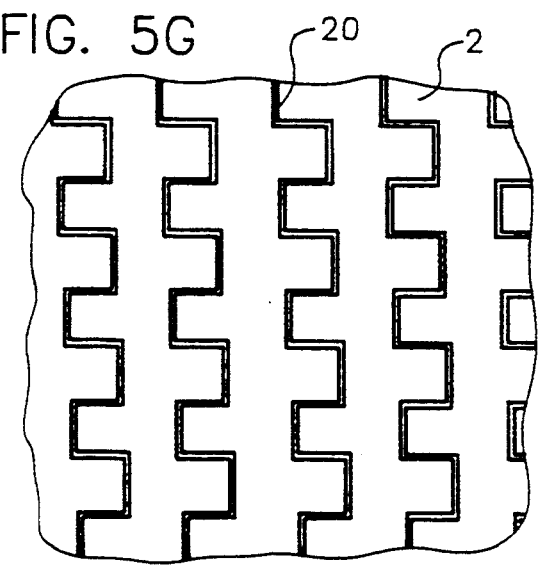
Figure 5H:
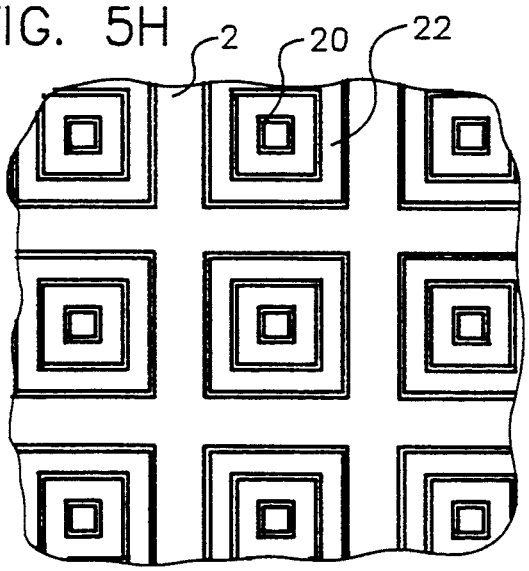
Figure 5I:
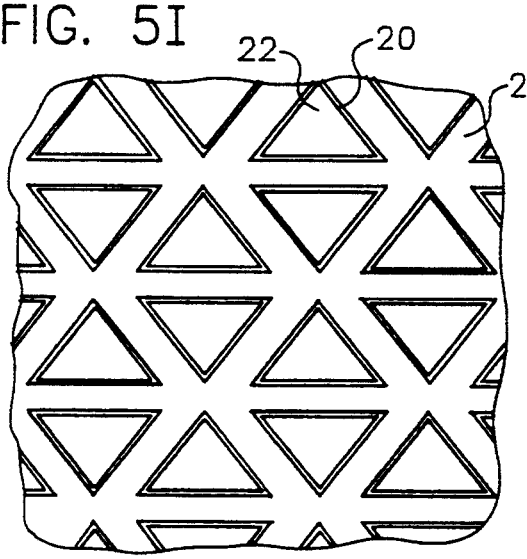
Figure 5J:
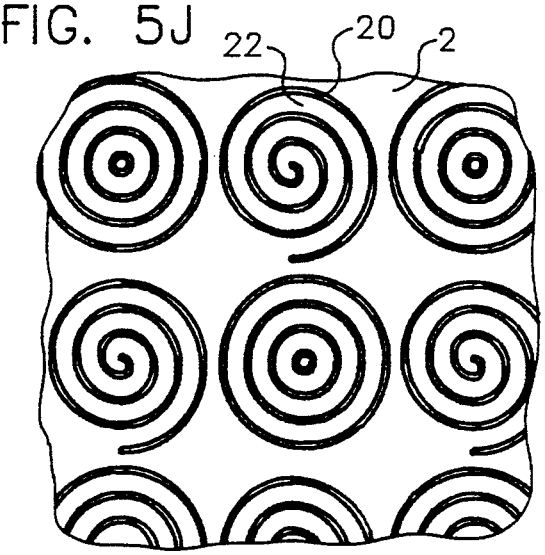
Figure 5K:
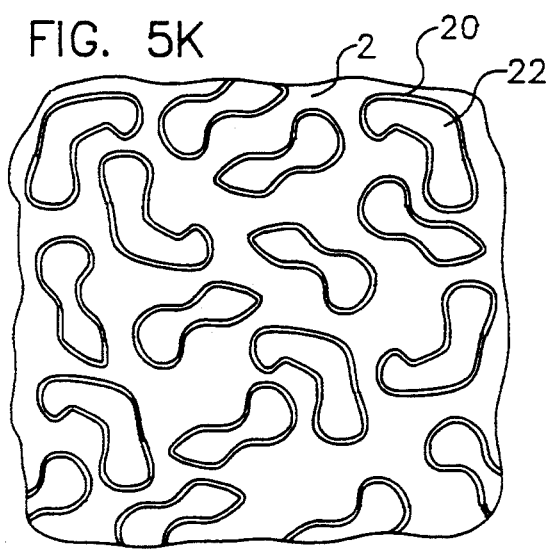
Figure 5L:
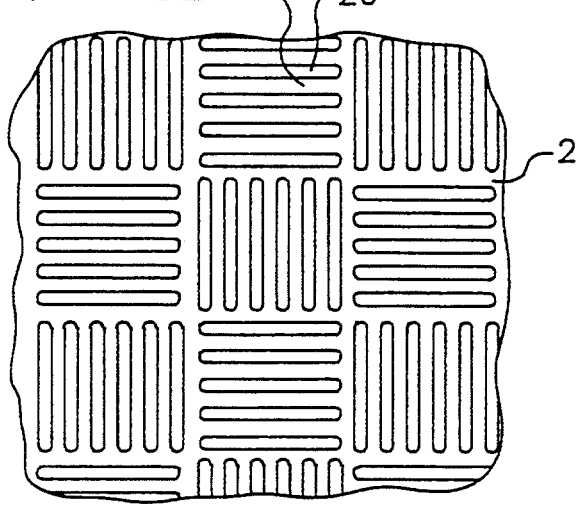
Figure 5M:
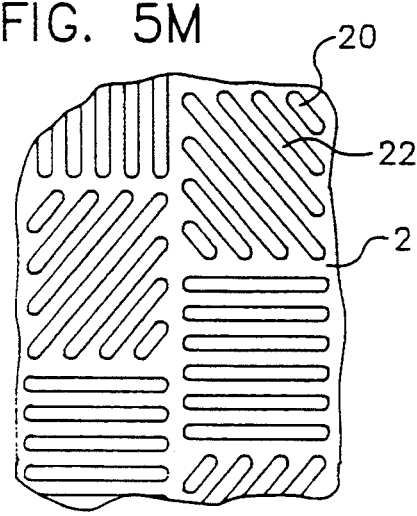
Figure 5N:
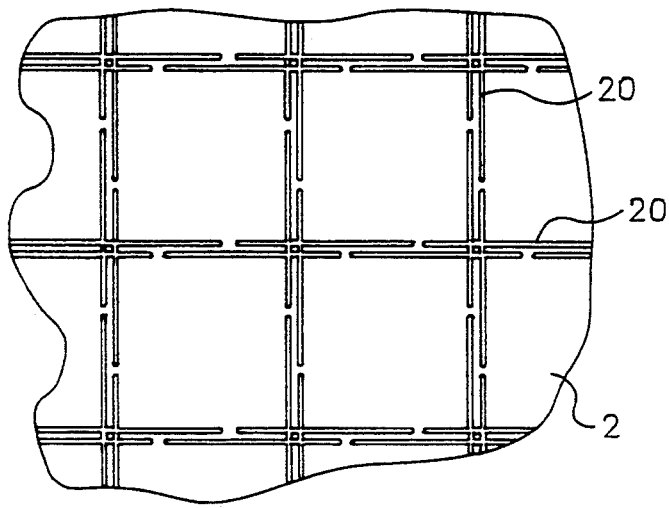

Referring to FIG. 4, an optional stiff constraint layer 16 may be attached to damping layer 6 in order to increase the damping characteristics of the present invention by generating shear energy. Stiff constraint layer 16 may either be continuously or discontinuously attached to damping layer 6. Preferably, stiff constraint layer 16 is discontinuously attached to damping layer 6 such that additional discontinuities 20 are located in one or more of stiff constraint layer 16, damping layer 6, and/or adhesive layer 18, if present. Again, the pattern of the discontinuities 20 may have any shape, pattern or grouping, and may have a u-shaped, v-shaped, square-shaped or rectangular shaped cross-section, for example.

Figure 6:
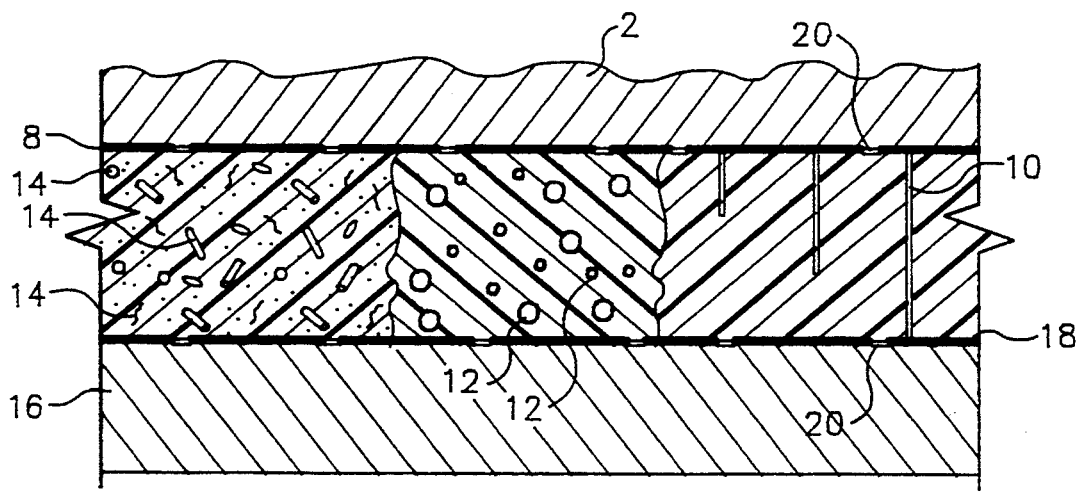
FIG. 6 is a partial side view of the second embodiment of the present invention showing discontinuous attachment of a non-homogeneous damping layer.

As shown in FIG. 6, the second embodiment of the present invention employing discontinuities 20 between primary structure 2 and damping layer 6, and optionally between damping layer 6 and stiff constraint layer 16 when present, can employ the non-homogeneous damping layer 6 of the first embodiment. Thus, as shown in FIG. 9 any or all of planar voids 10, substantially spherical voids 12 and particles 14 may be present within a non-homogeneous damping layer 6. In this manner, the vibration damping properties of the present invention are increased by employing both a non-homogeneous damping layer 6, and discontinuities 20 between the primary structure 2, damping layer 6, and adhesive layer 8, if present.

Figure 7:
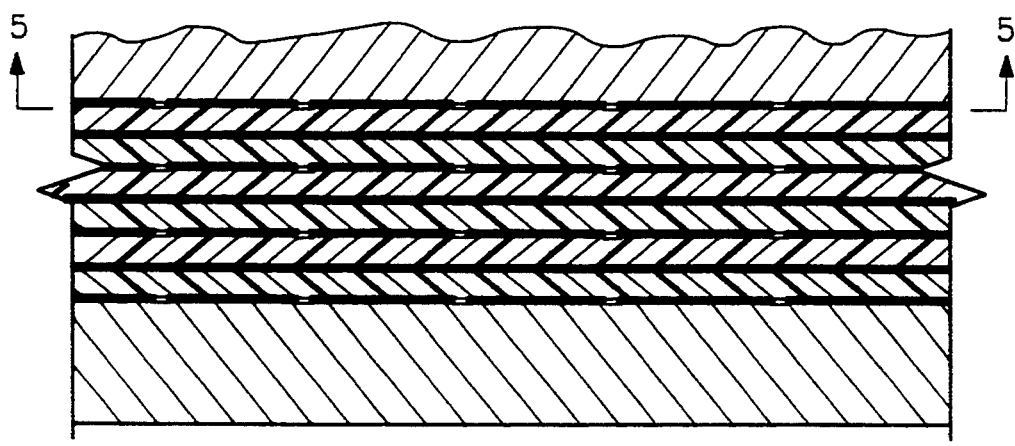
FIG. 7 is a partial side view of the second embodiment of the present invention showing discontinuous attachment of more than one damping layer.

Referring now to FIG. 7, the second embodiment of the present invention contemplates the use of more than one damping layers 6A through F. These damping layers 6A through F may all be homogeneous, may all be non-homogeneous to the same degree, may have varying degrees of non-homogeneity, or may be a combination of homogeneous and non-homogeneous damping layers with the non-homogeneous damping layers either having the same degree of non-homogeneity or different degrees of non-homogeneity. Additionally, a plurality of discontinuities 20A through D are present between the multiple damping layers 6A through F. Specifically, discontinuities 20A through D may be present between some or all of damping layers 6A through F. It is readily apparent that the number of damping layers 6A through F and the location of the discontinuities 20A through D between damping layers 6A through F are merely exemplary and more or less damping layers 6A through F and more or less discontinuities 20A through D may be employed.

Figure 8:
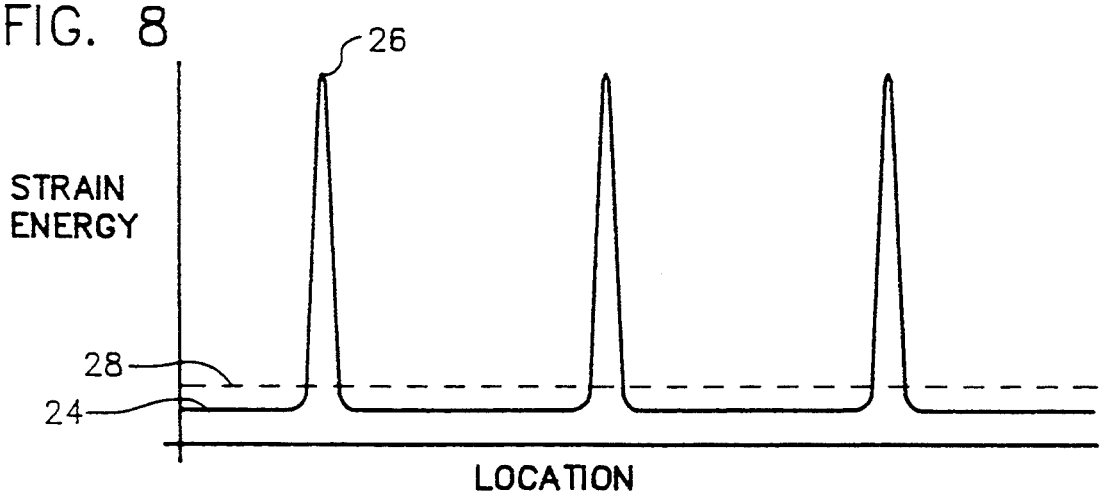
FIG. 8 is a graphical representation of strain energy measured in the composition for vibration damping of the present invention, and shows increased strain energy at the location of any area of non-homogeneity in the damping layer and at the location of any discontinuity in the attachment of the damping layer to the structure of the surface.

Referring next to FIG. 8, a graphical representation of strain energy measured in both the first embodiment and the second embodiment of the compositions for vibration damping of the present invention is shown. FIG. 8 shows a base-line strain energy 24 for the portions of damping layer 6 in which neither an area of non-homogeneity (defined by planar voids 10, spherical voids 12, or particle voids 14) nor a discontinuity 20 is present. Peak strain energy 26 shows the increased strain energy at the location in damping layer 6 of either an area of non-homogeneity (defined by a planar void 10, a spherical void 12, or a particle 14), or a discontinuity 20. It is readily apparent from the graphical representation of FIG. 8 that the plurality of peak strain energies 26 results in an increase in the base line strain energy 24 such that a relatively greater total strain energy 28 is present. This greater total strain energy 28 of damping layer 6 results in a greater amount of vibrational energy from structure 2 being dampened and converted into heat by the composition for vibration damping of the present invention.

While preferred embodiments of the invention have been illustrated and described, it will be appreciated that various changes can be made therein without departing from the spirit and scope of the invention.

I claim:

1. A composition for vibration damping of a structure releasing vibrational energy through its surface, said composition comprising:
    an elastromeric damping layer on the surface of the structure such that the vibrational energy released through the surface of the structure is converted into strain energy and is dissipated as heat by said damping layer, said damping layer being discontinuously attached to the surface of the structure such that the strain energy dissipated as heat by said damping layer is increased.

2. The composition of claim 1 further comprising:
    an adhesive layer discontinuously attaching said damping layer to the surface of the structure.

3. The composition of claim 1 further comprising:
    at least a second damping layer attached to said damping layer such that multiple damping layers are present.

4. The composition of claim 3 further comprising:
    adhesive layers attaching said multiple damping layers.

5. The composition of claim 3 wherein at least some of said multiple damping layers are discontinuously attached.

6. The composition of claim 3 wherein at least some of said multiple damping layers are substantially non-homogenous.

7. The composition of claim 1 wherein said damping layer is substantially non-homogeneous.

8. The composition of claim 1 further comprising:
    a stiff constraint layer on said damping layer, said stiff constraint layer increasing the strain energy that is dissipated as heat by said damping layer.

9. The composition of claim 5 wherein said stiff constraint layer is discontinuously attached to said damping layer.

10. The composition of claim 1 wherein said discontinuous attachment of said damping layer to the surface of the structure includes at least one of a plurality of grooves, a plurality of indentations, and a configuration of material non-adhesive with respect to at least one of the structure releasing vibrational energy and said damping layer.

11. The composition of claim 10 wherein said discontinuous attachment is in a pattern having points of intersection therein.

12. The composition of claim 10 wherein said discontinuous attachment is in a pattern lacking points of intersection therein.

13. The composition of claim 10 wherein said discontinuous attachment is in a parallel pattern.

14. The composition of claim 10 wherein said discontinuous attachment is in an aparallel pattern.

15. The composition of claim 10 wherein said discontinuous attachment is interrupted by points of attachment of said damping layer and the surface of the structure.

16. The composition of claim 1 further comprising a second structure releasing vibrational energy through its surface, said damping layer being between the surface of the structure releasing vibrational energy and the surface of the second structure releasing vibrational energy.

17. A composition for vibration damping of a structure releasing vibrational energy through its surface, said composition comprising:
    a damping layer on the surface of the structure, said damping layer converting vibrational energy into strain energy and dissipating the strain energy as heat, said damping layer being substantially non-homogeneous and being discontinuously attached to the surface of the structure such that the strain energy dissipated as heat by said damping layer is increased.

18. A method of vibrational damping a structure releasing vibrational energy through its surface, comprising the step of:
    forming a damping layer on the surface of the structure such that vibrational energy released through the surface of the structure is converted into strain energy and is dissipated as heat by said damping layer, said damping layer being discontinuously formed to the surface of the structure such that the strain energy dissipated as heat by said damping layer is increased.

19. A composition for vibration damping of a structure releasing vibrational energy through its surface, said composition comprising:
    a visco-elastic damping layer on the surface of the structure such that the vibrational energy released through the surface of the structure is converted into strain energy and is dissipated as heat by said damping layer, said damping layer being discontinuously attached to the surface of the structure such that the strain energy dissipated as heat by said damping layer is increased.

* * * * *